United States Patent
Chen et al.

(10) Patent No.: US 12,075,305 B2
(45) Date of Patent: Aug. 27, 2024

(54) USER PLANE SETUP DURING 5G SYSTEM TO EVOLVED PACKET SYSTEM HANDOVER

(71) Applicant: Telefonaktiebolaget LM Ericsson (publ), Stockholm (SE)

(72) Inventors: Qian Chen, Mölndal (SE); Juying Gan, Shanghai (CN); Stefan Rommer, Västra Frölunda (SE); Ann-Christine Sander, Skepplanda (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/112,865

(22) Filed: Feb. 22, 2023

(65) Prior Publication Data
US 2023/0284114 A1   Sep. 7, 2023

Related U.S. Application Data

(62) Division of application No. 17/268,396, filed as application No. PCT/CN2019/100377 on Aug. 13, 2019, now abandoned.

(30) Foreign Application Priority Data

Aug. 14, 2018   (WO) ................ PCT/CN2018/100512

(51) Int. Cl.
*H04W 36/00*   (2009.01)
*H04W 8/08*   (2009.01)
(Continued)

(52) U.S. Cl.
CPC ............. *H04W 36/32* (2013.01); *H04W 8/08* (2013.01); *H04W 36/0022* (2013.01); *H04W 48/16* (2013.01)

(58) Field of Classification Search
CPC ........... H04W 8/02; H04W 8/04; H04W 8/06; H04W 36/0022; H04W 36/00222;
(Continued)

(56) References Cited

U.S. PATENT DOCUMENTS 9,443,320 B1   9/2016   Gaidon et al.
2021/0243678 A1   8/2021   Drevon et al.

FOREIGN PATENT DOCUMENTS

CN   103413295 A   11/2013
CN   106797451 A   5/2017
(Continued)

OTHER PUBLICATIONS

Author Unknown, "Technical Specification Group Services and System Aspects; Network Sharing; Architecture and functional description (Release 15)," Technical Specification 23.251, Version 15.0.0, 3GPP Organizational Partners, Jun. 2018, 39 pages.
(Continued)

*Primary Examiner* — Matthew W Genack
(74) *Attorney, Agent, or Firm* — Withrow & Terranova, PLLC

(57) ABSTRACT

System comprising a mobility management entity, MME, a first Radio Access node, RAN (eNB) offering Long Term Evolution, LTE, access, and a second radio access node, RAN (gNB) offering New Radio, NR, access; a user entity, UE, supporting both Long Term Evolution, LTE, and New Radio, NR, Radio Access Technology, RAT.

2 Claims, 9 Drawing Sheets

(51) Int. Cl.
*H04W 36/32* (2009.01)
*H04W 48/16* (2009.01)

(58) Field of Classification Search
CPC ......... H04W 36/0033; H04W 36/0066; H04W 36/32; H04W 48/16; H04W 64/00; H04W 64/003
See application file for complete search history.

(56) References Cited

FOREIGN PATENT DOCUMENTS

| CN | 108282832 A | | 7/2018 | |
|---|---|---|---|---|
| WO | 2013033883 A1 | | 3/2013 | |
| WO | WO-2014005525 A1 | * | 1/2014 | ............ H04W 28/26 |
| WO | 2014053922 A1 | | 4/2014 | |
| WO | WO-2018104579 A1 | * | 6/2018 | |

OTHER PUBLICATIONS

Author Unknown, "Technical Specification Group Services and System Aspects; General Packet Radio Service (GPRS) enhancements for Evolved Universal Terrestrial Radio Access Network (E-UTRAN) access (Release 15)," Technical Specification 23.401, Version 15.1.0, 3GPP Organizational Partners, Sep. 2017, 397 pages.
Author Unknown, "Technical Specification Group Services and System Aspects; General Packet Radio Service (GPRS) enhancements for Evolved Universal Terrestrial Radio Access Network (E-UTRAN) access (Release 15)," Technical Specification 23.401, Version 15.4.0, Jun. 2018, 3GPP Organizational Partners, 410 pages.
Author Unknown, "Technical Specification Group Services and System Aspects; System Architecture for the 5G System; Stage 2 (Release 15)," Technical Specification 23.501, Version 0.5.0, 3GPP Organizational Partners, May 2017, 145 pages.
Author Unknown, "Technical Specification Group Services and System Aspects; System Architecture for the 5G System; Stage 2 (Release 15)," Technical Specification 23.501, Version 15.2.0, 3GPP Organizational Partners, Jun. 2018, 217 pages.
Author Unknown, "Technical Specification Group Services and System Aspects; Procedures for the 5G System; Stage 2 (Release 15)," Technical Specification 23.502, Version 15.2.0, 3GPP Organizational Partners, Jun. 2018, 308 pages.
Author Unknown, "Network Functions Virtualisation (NFV); Architectural Framework," European Telecommunications Standards Institute (ETSI), Group Specification (GS) NFV 002, Version 1.1.1, Oct. 2013, 21 pages.
Ericsson, "S2-1810263: IWK support for handover of PDU sessions without UP," 3GPP WG2 Temporary Document, Oct. 15-19, 2018, Dongguan, China, 4 pages.
Ericsson, "S2-187924: IWK support for handover of PDU sessions without UP," 3GPP TSG-SA WG2, Meeting #128bis, Aug. 20-24, 2018, Sophia Antipolis, France, 6 pages.
Huawei, et al., "S2-1810484: Handover of deactivated PDU session to 4G," 3GPP TSG-SA WG2, Meeting #129, Oct. 15-19, 2018, Dongguan, China, 7 pages.
Huawei et al., "S2-183449: CN tunnel handling during IRAT handover," Third Generation Partnership Project (3GPP), TSG-SA WG2 Meeting #127, Apr. 16-20, 2018, 16 pages, Sanya, China.
International Search Report and Written Opinion for International Patent Application No. PCT/CN2019/100377, mailed Nov. 12, 2019, 8 pages.
European Search Report for European Patent Application No. 19850250.2, mailed Sep. 1, 2021, 5 pages.
Examination Report for European Patent Application No. 19850250.2, mailed Sep. 14, 2021, 20 pages.
Non-Final Office Action for U.S. Appl. No. 17/268,396, mailed Nov. 22, 2022, 7 pages.
Jang, et al., "Application-Aware IoT Camera Virtualization for Video Analytics Edge Computing," ACM/IEEE Symposium on Edge Computing, 2018, IEEE, pp. 132-144.
Wedge, et al., "Object Tracking over Multiple Uncalibrated Cameras Using Visual, Spatial and Temporal Similarities," 12th International Conference on Advanced Concepts for Intelligent Vision Systems, 2010, Springer-Verlag Berlin Heidelberg, pp. 167-178.
First Office Action for Chinese Patent Application No. 201880099954.9, mailed Sep. 28, 2023, 15 pages.

\* cited by examiner

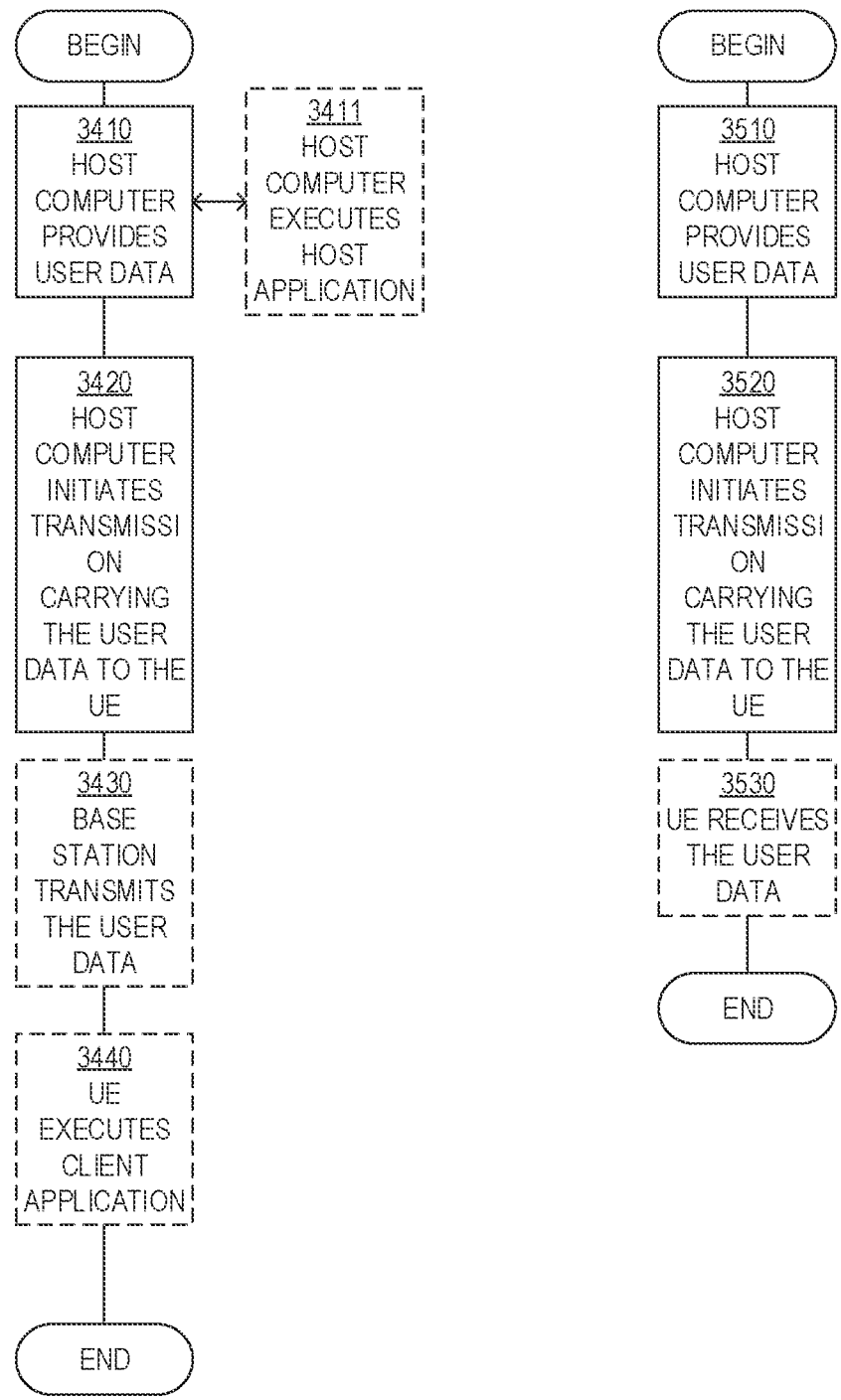

USER PLANE SETUP DURING 5G SYSTEM TO EVOLVED PACKET SYSTEM HANDOVER

This application is a divisional of U.S. patent application Ser. No. 17/268,396, filed Feb. 12, 2021, which is a 35 U.S.C. § 371 national phase filing of International Application No. PCT/CN2019/100377, filed Aug. 13, 2019, which claims the benefit of International Application No. PCT/CN2018/100512, filed Aug. 14, 2018, the disclosures of which are incorporated herein by reference in their entireties.

TECHNICAL FIELD

The present invention is directed to methods and apparatuses involving Long Term Evolution, LTE/Evolved Packet System, EPS, and New Radio, NR, radio access/5G System core network technologies.

BACKGROUND

The well-known SAE-LTE (System Architecture Evolution—Long Term Evolution) architecture has been shown in FIG. 1. In the 5G work in 3GPP a split between Mobility Management (MM) and Session Management (SM) has been defined compared to in EPC, (Evolved Packet Core) where MME (Mobility management Entity) supports both MM (Mobility management) and some SM (Session management) functionality. The Access and Mobility Function (AMF) supports MM functionality and the Session Management Function (SMF) supports SM functionality. The AMF (Access and Mobility Management Function) selects the SMF. Different SMFs may be selected for different PDU (Packet Data Unit) Sessions of a UE (User Entity), e.g. PDU Sessions to different Data Network Names (DNNs)/Access Point Name, APNs, or the same SMF may be used. The reference architecture is shown in the FIG. 2, which corresponds to TS 23.501 V0.5.0 (2017 May), fig. 4.2.3-3.

FIG. 3 shows the so-called N26 interface that is an inter-CN (Core Network) interface between the MME and 5GS AMF in order to enable interworking between EPC and the NG (Next Generation) core. Support of N26 interface in the network is optional for interworking. N26 supports subset of the functionalities (essential for interworking) that are supported over S10. Fig. corresponds to Figure 4.3.1-1: Non-roaming architecture for interworking between 5GS and EPC/E-UTRAN (Evolved Terrestrial Radio Access Network) of TS 23.501 V15.2.0 (2018 June).

In 5GS there is support for selective UP (User Plane) activation and deactivation as specified in TS 23.501 clause 5.6.8 reads:

5.6.8 Selective Activation and Deactivation of UP Connection of Existing PDU Session This clause applies to the case when a UE has established multiple PDU (Protocol Data Unit) Sessions. The activation of a UP connection of an existing PDU Session causes the activation of its UE-CN User Plane connection (i.e. data radio bearer and N3 tunnel).

For the UE in the CM-IDLE (Connection Management—Idle) state in 3GPP access, either UE or Network-Triggered Service Request procedure may support independent activation of UP connection of existing PDU Session. For the UE in the CM-IDLE state in non-3GPP access, UE-Triggered Service Request procedure allows the re-activation of UP connection of existing PDU Sessions and may support independent activation of UP connection of existing PDU Session.

A UE in the CM-CONNECTED state invokes a Service Request (see TS 23.502 [3] clause 4.2.3.2) procedure to request the independent activation of the UP connection of existing PDU Sessions.

Network Triggered re-activation of UP connection of existing PDU Sessions is handled as follows:

If the UE CM state in the AMF is already CM-CONNECTED on the access (3GPP, non-3GPP) associated to the PDU Session in the SMF, the network may re-activate the UP connection of a PDU Session using a Network Initiated Service Request procedure.

Otherwise:

If the UE is registered in both 3GPP and non-3GPP accesses and the UE CM state in the AMF is CM-IDLE in non-3GPP access, the UE can be paged or notified through the 3GPP access for a PDU Session associated in the SMF (i.e. last routed) to the non-3GPP access:

If the UE CM state in the AMF is CM-IDLE in 3GPP access, the paging message may include the access type associated with the PDU Session in the SMF. The UE, upon reception of the paging message containing an access type, shall reply to the 5GC via the 3GPP access using the NAS Service Request message, which shall contain the list of PDU Sessions associated with the received access type and whose UP connections can be re-activated over 3GPP (i.e. the list does not contain the PDU Sessions whose UP connections cannot be re-activated on 3GPP based on UE policies and whether the S-NSSAIs of these PDU Sessions are within the Allowed NSSAI for 3GPP access). If the PDU Session for which the UE has been paged is in the list of the PDU Sessions provided in the NAS Service Request, the 5GC shall re-activate the PDU Session UP connection over 3GPP access;

If the UE CM state in the AMF is CM-CONNECTED in 3GPP access, the notification message shall include the non-3GPP Access Type. The UE, upon reception of the notification message, shall reply to the 5GC via the 3GPP access using the NAS Service Request message, which shall contain the List of Allowed PDU Sessions that can be re-activated over 3GPP or an empty List of Allowed PDU Sessions if no PDU Sessions are allowed to be re-activated over 3GPP access.

NOTE: A UE that is in a coverage of a non-3GPP access and has PDU Session(s) that are associated in the UE (i.e. last routed) to non-3GPP access, is assumed to attempt to connect to it without the need to be paged.

If the UE is registered in both 3GPP and non-3GPP accesses served by the same AMF and the UE CM state in the AMF is CM-IDLE in 3GPP access and is in CM-CONNECTED in non 3GPP access, the UE can be notified through the non-3GPP for a PDU Session associated in the SMF (i.e. last routed) to the 3GPP access. The notification message shall include the 3GPP Access Type. Upon reception of the notification message, when 3GPP access is available, the UE shall reply to the 5GC via the 3GPP access using the NAS Service Request message.

End of 5.6.8.

The deactivation of the UP connection of an existing PDU Session causes the corresponding data radio bearer and N3 tunnel to be deactivated. The UP connection of different PDU Sessions can be deactivated independently when a UE is in CM-CONNECTED state in 3GPP access or non-3GPP access.

Since there is no equivalent support in EPS, which requires UP for all PDU session shall be established in CM-CONNECTED state. If a PDU session does not have UP, the PDU session will be removed totally.

SUMMARY

Due to the different requirements/treatments in 5GS and EPS as described above, a UE in 5GS in CM-CONNECTED mode with for example PDU session 1, 2 and 3, but only PDU session 1 has UP, after the HO (HandOver) from 5GS to EPS, it will only have PDU session 1 left. The other 2 PDU sessions will be deleted after mobility. UE need to re-establish the needed PDU session from scratch.

This means certain service, e.g. IMS (IP Multimedia Subsystem) service, will be impacted significantly. Typically, the UE will have to setup the IMS APN (Access Point Name) in EPS, and reregister to IMS, causing additional signalling in the network. In addition, the UE will be unavailable for any IMS service during the time until it has successfully re-registered into IMS.

It is a first object to set forth a methods and apparatuses for providing a handover procedure from 5GS to EPS.

It is a further object to provide a means for user plane resource setup during the inter-system handover from 5GS to EPS procedure, and the PDU sessions without UP when HO is triggered can be kept after the HO, wherein the selective User Plane, UP, in 5GS will not be impacted by the EPS.

The object mentioned above has been accomplished by:

A Method for a Long-Term Evolution Radio Access Node, LTE RAN, E-UTRAN, (eNB) adapted for
  engaging in a handover from a Next Generation RAN, denoted source RAN to said LTE RAN, denoted target RAN,
  receiving a Handover Request message from a Mobility Management Entity, MME,
  allocating resources or bearers requested by a Mobility Management Entity, MME, even though said resources or said bearers are not included in a transparent container from the source RAN.

It has also been accomplished by a method for a system comprising
  a Long-Term Evolution Radio Access Node, LTE RAN, E-UTRAN (eNB),
  a Next Generation Radio Access Node, RAN, denoted target RAN
  an Access and Mobility Management Function, AMF,
  a Mobility Management Entity, MME,
  a Serving Gateway, SGW,
  a Visited User Plane Function, V-UPF,
  the system being adapted for
    the NG RAN NG, denoted source RAN, deciding that the UE should be handed over to the LTE RAN, denoted target RAN, and sending a Handover Required to the AMF,
    the AMF determining from a 'Target eNB Identifier' IE that the type of handover is Handover to E-UTRAN, the AMF selecting an MME, and sending Nsmf_PDU Session_Context Request requests the V-SMF for each PDU Session associated with 3GPP access to provide SM Context that also includes mapped EPS Bearer Contexts,
    the AMF receiving a Nsmf_PDU Session_Context Request response,
    the AMF issuing a relocation request to the MME,
    the MME and SGW engaging in create session request and response messaging,
    the MME issuing a handover request to the LTE RAN,
    the LTE RAN allocating resources or bearers requested by MME even though said resources or said bearers are not included in a transparent container from the source RAN.

Further objects have been accomplished by the following:

A method for an AMF, adapted to perform issuing a Nmsf PDU Session Context request to a SMF, even for PDU sessions without user plane currently, that is, also for PDU sessions not included in a Handover Required message from NG-RAN.

A method for an AMF adapted for not applying indirect data forwarding for the PDU sessions that does not have user plane in NG-RAN previously.

A method for a Next Generation RAN, NG RAN (gNB) adapted to accept a handover command from an AMF even when a transparent container from target RAN, such as eNB, includes more user plane for bearers than NG-RAN required, the NG-RAN moreover adapted for delivering the handover command to UE.

A method UE being adapted for accepting a handover command and allocating a user plane resource as re-quested in the handover, HO, command when moving to a target RAN such as eNB.

A method for a UE being adapted for correlating QoS flows that does not have user plane resource currently with EPS bearer IDs to be setup in the HO command.

The above object has also been accomplished by corresponding apparatuses.

BRIEF DESCRIPTION OF THE DRAWINGS

FIGS. 10 and 11 are flowcharts illustrating methods implemented in a communication system including a host computer, a base station and a user equipment.

DETAILED DESCRIPTION

The solution proposes, during inter-system handover from 5GS to EPS:
1) Besides the PDU sessions indicated by the RAN (Radio Access Node) for the PDU session with UP in HO Required, source AMF/SMF shall also allocate the CN (Core Network) related tunnel info for the PDU session without UP and provide them to the target MME/SGW side through Forward Relocation Request
2) target MME/SGW setup the UP resource in core network for all the PDU sessions received and indicate the information to target RAN through HO request
3) Target RAN (e.g. eNB) setup UP resource for all the PDU sessions indicated from target MME, even the ones not required by the source RAN (e.g. gNB (Next generation NodeB)) but required by the MME. Then provide the info to MME and MME pass the info to source AMF/SMF as normal in HO Request acknowledge.
4) Source AMF/SMF provide the UP resources info from target RAN to source RAN in HO command. Source RAN accepts the HO even target RAN has allocated more UP resources than it has requested and sends HO command to UE including the information provided from the target RAN side.
5) UE shall accept the HO command and follow the instructions from target RAN side and setup UP for all PDU sessions after moving to 4G side.

Provide a means for user plane resource setup during the inter-system handover from 5GS to EPS procedure, and the PDU sessions without UP when HO is triggered can be kept after the HO.

The selective UP in 5GS will not be impacted by the EPS, and work as it intended.

Figure 1:
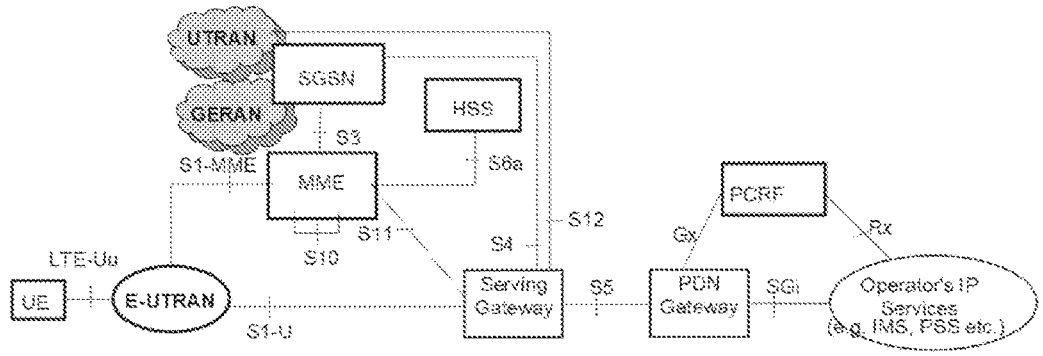
FIG. 1 shows a known reference architecture for a LTE access and core network system for a non-roaming scenario, reflecting 3GPP TS 23.401 V15.1.0 (2017 September) Figure 4.2.1-1: Non-roaming architecture for 3GPP accesses.
Figure 2:
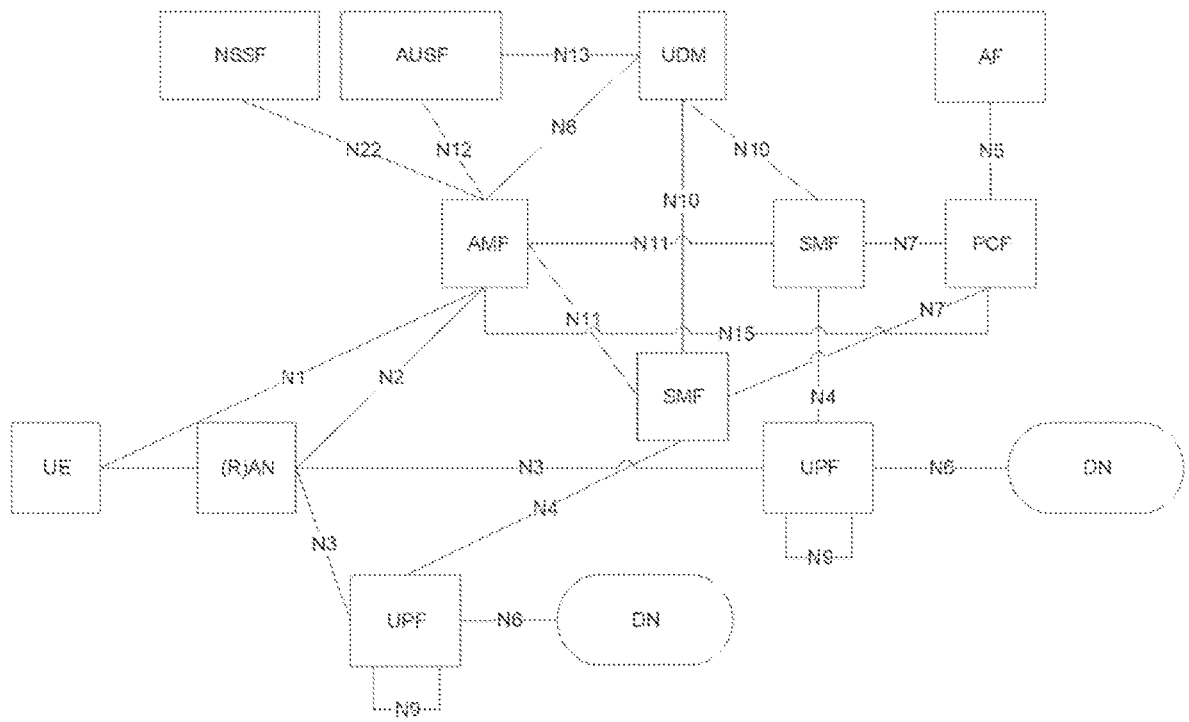
FIG. 2 shows a known reference architecture for a 5G access and core network system for a non-roaming scenario, corresponding to TS 23.501 V15.2.0 (2018 June), FIG. 4.2.3-3: Applying non-roaming 5G System architecture for multiple PDU session in reference point representation.
Figure 3:
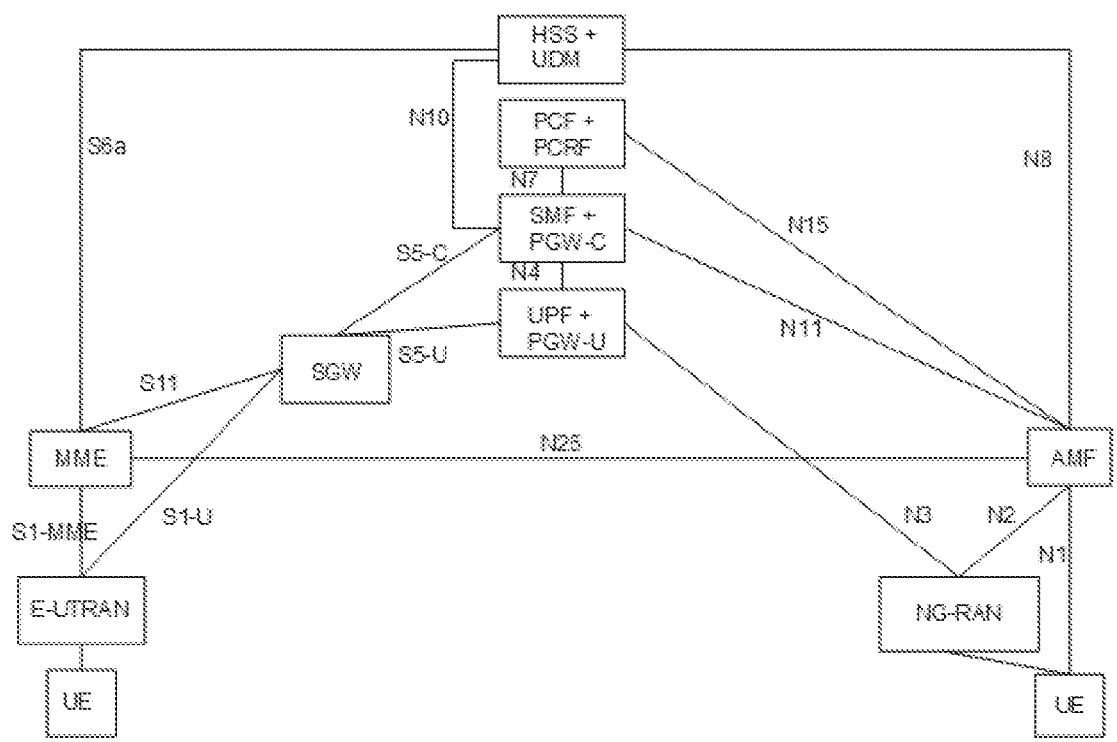
FIG. 3 shows a known reference architecture for a LTE and 5G access and 5G core network system, corresponding to TS 23.501 V15.2.0 (2018 June), Figure 4.3.1-1: Non-roaming architecture for interworking between 5GS and EPC/E-UTRAN.
Figure 4:
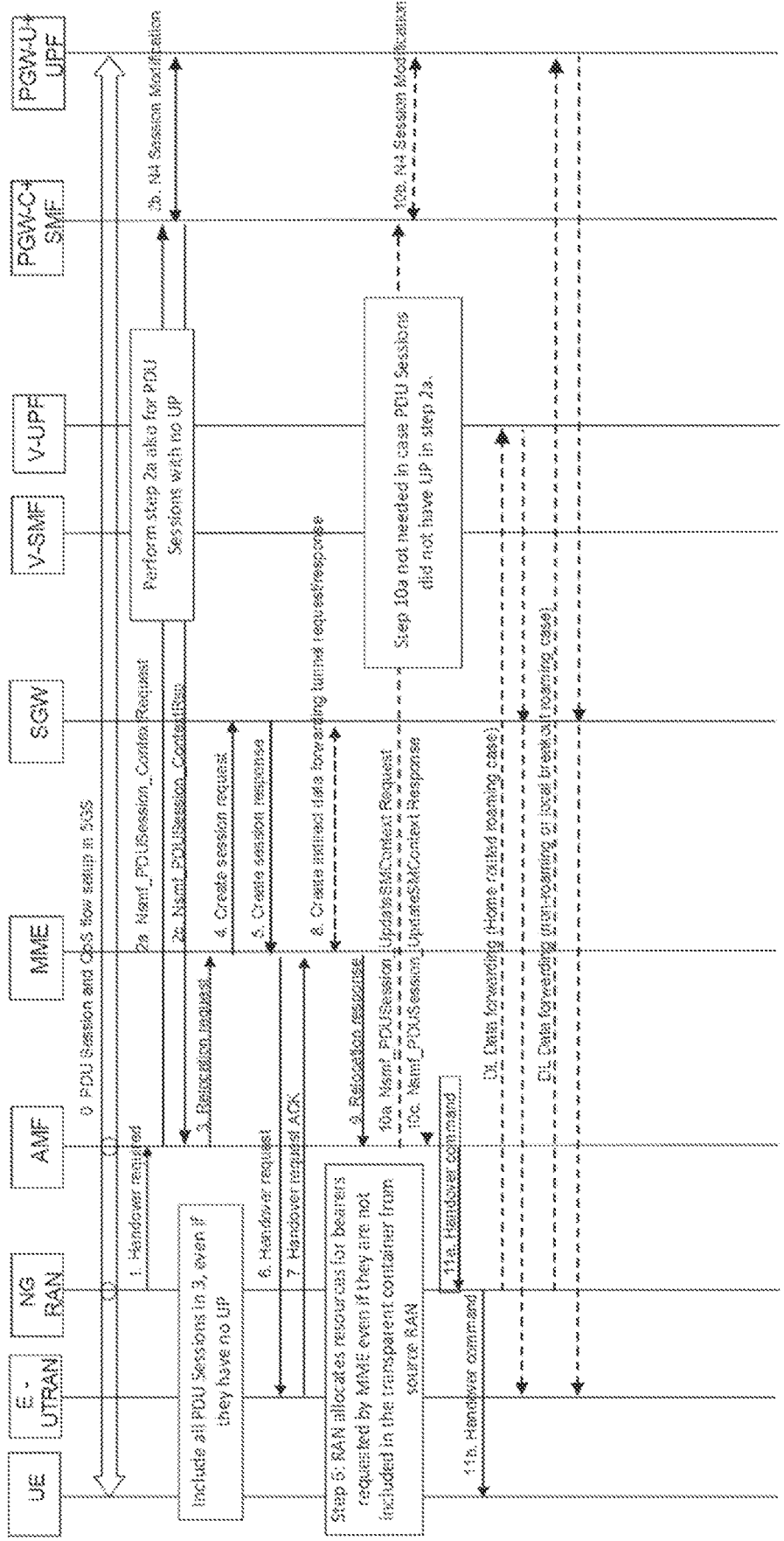
FIG. 4 shows a first embodiment of the invention.
Figure 5:
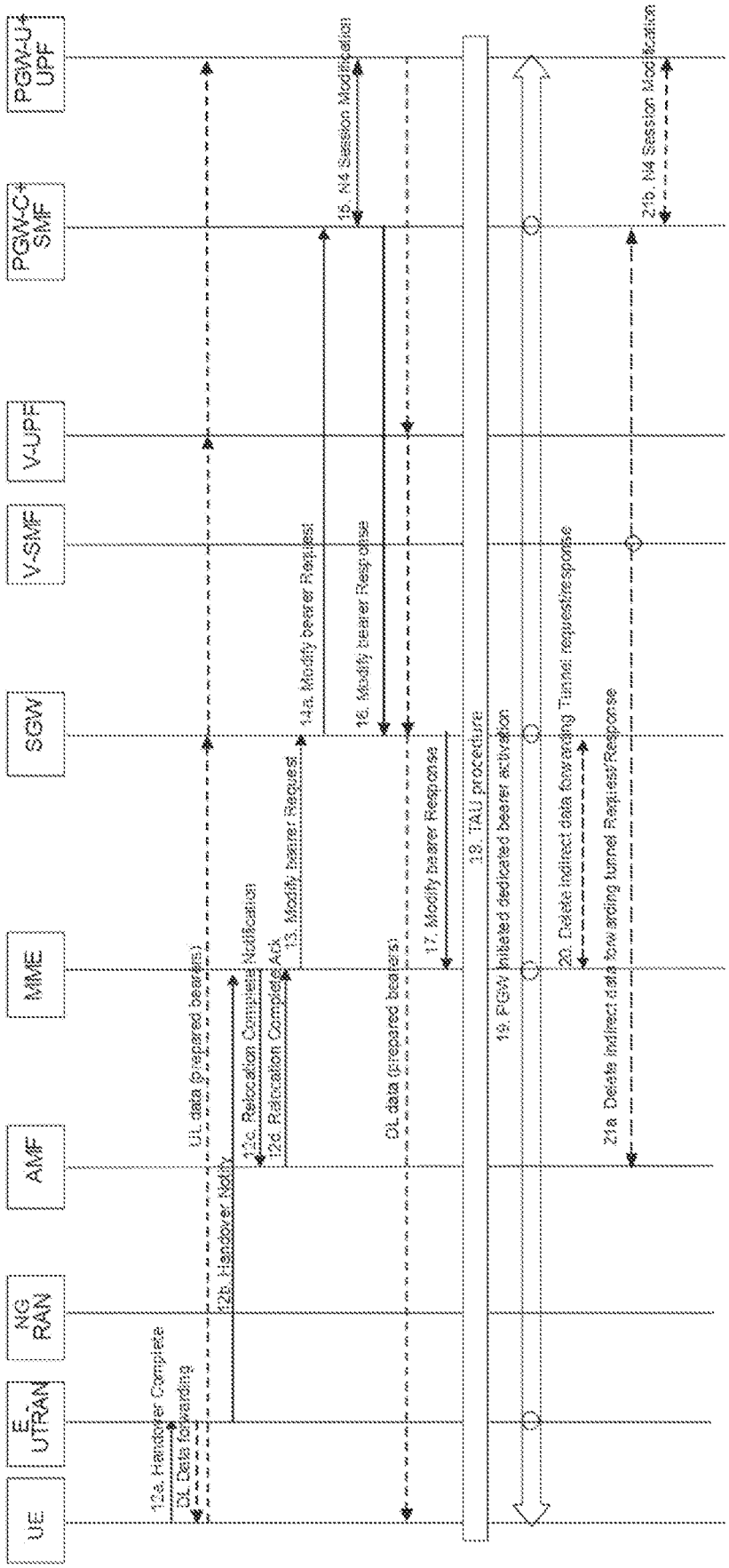
FIG. 5 is a continuation of FIG. 4.

With reference to FIGS. 4 and 5, according to embodiments of the invention 3GPP TS 23.502 V15.2.0 (2018 June) is arranged as in the following, wherein amendments are underlined:

4.11.1.2 Handover Procedures
4.11.1.2.1 5GS to EPS Handover Using N26 Interface

Figure 4.11.1.2.1-1 describes the handover procedure from 5GS to EPS when N26 is supported.

In the case of handover to a shared EPS network, the source NG-RAN determines a PLMN to be used in the target network as specified by TS 23.501 [2]. The source NG-RAN shall indicate the selected PLMN ID to be used in the target network to the AMF as part of the TAI sent in the HO Required message.

In the case of handover from a shared NG-RAN, the AMF may provide the MME with an indication that the 5GS PLMN is a preferred PLMN at later change of the UE to a 5GS shared networks.

During the handover procedure, as specified in clause 4.9.1.3.1, the source AMF shall reject any PGW-C+SMF initiated N2 request received since handover procedure started and shall include an indication that the request has been temporarily rejected due to handover procedure in progress.

Upon reception of a rejection for an PGW-C+SMF initiated N2 request(s) with an indication that the request has been temporarily rejected due to handover procedure in progress, the PGW-C+SMF behaves as specified in TS 23.401 [13].

Figure 4.11.1.2.1-1: 5GS to EPS Handover for Single-Registration Mode with N26 Interface The procedure involves a handover to EPC and setup of default EPS bearer and dedicated bearers for GBR (Guaranteed Bit Rate) QoS Flows in EPC in steps 1-16 and re-activation, if required, of dedicated EPS bearers for non-GBR QoS Flows in step 17. This procedure can be triggered, for example, due to new radio conditions, load balancing or in the presence of QoS Flow for normal voice or IMS emergency voice, the source NG-RAN node may trigger handover to EPC.

For Ethernet and Unstructured PDU Session Types, the PDN Type non-IP is used, when supported, in EPS. The SMF shall thus set the PDN Type of the EPS Bearer Context to non-IP in these cases. After the handover to EPS, the PDN Connection will have PDN Type non-IP, but it shall be locally associated in UE and SMF to PDU Session Type Ethernet or Unstructured respectively.

In the roaming home routed case, the PGW (Packet Data Network Gateway)-C+SMF always provides the EPS Bearer ID and the mapped QoS parameters to UE. The V-SMF (Visitor SMF) caches the EPS Bearer ID and the mapped QoS parameters obtained from H-SMF for this PDU session. This also applies in the case that the HPLMN (Home Public Land Mobile Network) operates the interworking procedure without N26.

NOTE 1: The IP address preservation cannot be supported, if PGW-C+SMF in the HPLMN doesn't provide the mapped QoS parameters.

1. NG (Next generation)-RAN decides that the UE should be handed over to the E-UTRAN. If NG-RAN is configured to perform Inter RAT (Radio Access Technology) mobility due to IMS voice fallback triggered by QoS (Quality of Service) flow setup and request to setup QoS flow for IMS voice was received, NG-RAN responds indicating rejection of the QoS flow establishment because of mobility due to fallback for IMS voice via N2 SM information and triggers handover to E-UTRAN. The NG-RAN sends a Handover Required (Target eNB (eNodeB) ID, Source to Target Transparent Container, inter system handover indication, Indirect Forwarding Flag) message to the AMF. NG-RAN indicates bearers corresponding to the 5G QoS Flows for data forwarding in Source to Target Transparent Container.

If the handover is triggered due to Emergency fallback, the NG-RAN may forward the Emergency indication to the target eNB in the Source to Target Transparent Container, and the target eNB allocates radio bearer resources taking received indication into account.

The Indirect Forwarding Flag indicates the applicability of indirect data forwarding.

2. In the case of HR roaming, the AMF determines from the 'Target eNB Identifier' IE that the type of handover is Handover to E-UTRAN. The AMF selects an MME as described in TS 23.401 [13] clause 4.3.8.3.

The AMF by using Nsmf_PDUSession_Context Request requests the V-SMF for each PDU Session associated with 3GPP access to provide SM Context that also includes the mapped EPS Bearer Contexts. The AMF provides the target MME capability to SMF in the request to allow the V-SMF to determine whether to included EPS Bearer context for non-IP PDN Type or not. For PDU Sessions with PDU Session Type Ethernet or Unstructured, the SMF provides SM Context for non-IP PDN Type.

In the case of non-roaming or LBO (Local Breakout) roaming, the AMF request PGW-C+SMF to provide SM Context by using Nsmf_PDUSession_ContextRequest. The PGW-C+SMF send N4 Session modification to PGW-U+

UPF to establish the CN tunnel for each EPS bearer and provide EPS Bearer Contexts to AMF, as described in step 8 of clause 4.11.1.4.1.

This step is performed with all PGW-C+SMFs allocated to the UE for each PDU Session of the UE.

The AMF also perform this step for the PDU sessions that are stored in AMF but are not part of the PDU sessions indicated by RAN in step 1. An SMF, holding a PDU session without user plane, shall allocate CN user plane resource (e.g. CN tunnel info) for the PDU session and provide the SM context in the same way as if a CN user plane is in place already.

NOTE 2: The AMF knows the MME capability to support non-IP PDN type or not through local configuration.

NOTE 3: In home routed roaming scenario, the UE's SM EPS Contexts are obtained from the V-SMF.

3. The AMF sends a Forward Relocation Request as in Step 2 in clause 5.5.1.2.2 (51-based handover, normal) in TS 23.401 [13], with the following modifications and clarifications:

Parameter "Return preferred" may be included. Return preferred is an optional indication by the MME of a preferred return of the UE to the 5GS PLMN at a later access change to a 5GS shared network. An MME may use this information as specified by TS 23.501 [2].

The SGW address and TEID ( ) for both the control-plane or EPS bearers in the message are such that target MME selects a new SGW. The AMF includes the Indirect Forwarding Flag received from the source NG-RAN to inform the target MME of the applicability of indirect data forwarding.

AMF includes also the PDN connection information for SMFs holding a PDU session without UP NOTE 4: The mapped SM EPS UE Contexts are included for PDU Sessions with and without active UP connections.

4-5. Step 4 and 4a respectively in clause 5.5.1.2.2 (51-based handover, normal) in TS 23.401 [13].

6. Step 5 (Handover Request) in clause 5.5.1.2.2 (51-based handover, normal) in TS 23.401 [13] with the following modification:

Handover Request may contain information Handover Restriction List with information about PLMN IDs as specified by TS 23.251 [35], clause 5.2a for eNodeB functions.

eNodeB allocates resources even for the bearers requested by MME even if it's not part of the bearers indicated in the source to target transparent container. eNodeB does not allocate a forwarding tunnel for the bearers not part of the source to target transparent container. eNodeB includes in target to source transparent container the bearers requested by source RAN and requested by core network.

7-9. Step 5a through 7 in clause 5.5.1.2.2 (51-based handover, normal) in TS 23.401 [13].

10a. If indirect data forwarding applies, the AMF sends the Nsmf_PDUSession_UpdateSMContext Request (Serving GW Address(es) and Serving GW DL TEID(s) (Tunnel endpoint identifiers) for data forwarding) to the PGW-C+SMF, for creating indirect data forwarding tunnel. If multiple PGW-C+SMFs serves the UE, the AMF maps the EPS bearers for Data forwarding to the PGW-C+SMF address(es) based on the association between the EPS bearer ID(s) and PDU Session ID(s). In home-routed roaming case, the AMF requests the V-SMF to create indirect forwarding tunnel.

The AMF may not apply indirect data forwarding for the PDU sessions that does not have user plane in NG-RAN previously.

10b. The PGW-C+SMF may select an intermediate PGW-U+UPF for data forwarding. The PGW-C+SMF maps the EPS bearers for Data forwarding to the 5G QoS flows based on the association between the EPS bearer ID(s) and QFI(s) for the QoS flow(s) in the PGW-C+SMF, and then sends the QFIs, Serving GW Address(es) and TEID(s) for data forwarding to the PGW-U+UPF. If CN Tunnel Info for Data Forwarding is allocated by the PGW-C+SMF, the CN Tunnel Info for Data Forwarding is provided to PGW-U+UPF in this step. The PGW-U+UPF acknowledges by sending a response. If CN Tunnel Info is allocated by the PGW-U+UPF, the CN Tunnel Info is provided to PGW-C+SMF in this response. In home-routed roaming case, the V-SMF selects the V-UPF for data forwarding.

10c. The PGW-C+SMF returns a Nsmf_PDUSession_UpdateSMContext Response (Cause, CN tunnel Info for Data Forwarding, QoS flows for Data Forwarding) for creating indirect data forwarding. Based on the correlation between QFI(s) and Serving GW Address(es) and TEID(s) for data forwarding, the PGW-U+UPF maps the QoS flow(s) into the data forwarding tunnel(s) in EPC.

11. The AMF sends the Handover Command to the source NG-RAN (Transparent container (radio aspect parameters that the target eNB has set-up in the preparation phase), CN tunnel info for data forwarding per PDU Session, QoS flows for Data Forwarding). The NG-RAN shall accept target RAN establishing extra user plane resources in the transparent container. The source NG-RAN commands the UE to handover to the target access network by sending the HO Command. The UE correlates the ongoing QoS Flows with the indicated EPS Bearer IDs to be setup in the HO command. The UE shall also correlate the QoS flows that does not have user plane resource currently with EPS bearer IDs to be setup in the HO command. The UE locally deletes the PDU Session if the QoS Flow associated with the default QoS rule in the PDU Session does not have an EPS Bearer ID assigned. If the QoS Flow associated with the default QoS rule has an EPS Bearer ID assigned, the UE keeps the PDU Session (PDN connection) and for the remaining QoS Flow(s) that do not have EPS bearer ID(s) assigned, the UE locally deletes the QoS rule(s) and the QoS Flow level QoS parameters if any associated with those QoS Flow(s). The UE deletes any UE derived QoS rules. The EPS Bearer ID that was assigned for the QoS flow of the default QoS rule in the PDU Session becomes the EPS Bearer ID of the default bearer in the corresponding PDN connection.

For the QoS Flows indicated in the "QoS Flows for Data Forwarding", NG-RAN initiate data forwarding via to the PGW-U+UPF based on the CN Tunnel Info for Data Forwarding per PDU Session. Then the PGW-U+UPF maps data received from the data forwarding tunnel(s) in the 5GS to the data forwarding tunnel(s) in EPS and sends the data to the target eNodeB via the Serving GW.

12-12c. Step 13 to step 14 from clause 5.5.1.2.2 (51-based handover, normal) in TS 23.401 [13].

12d. The AMF acknowledges MME with Relocation Complete Ack message. A timer in AMF is started to supervise when resources in the in NG-RAN and PGW-C+SMF shall be released.

13. Step 15 from clause 5.5.1.2.2 (51-based handover, normal) in TS 23.401 [13].

14. Step 16 (Modify Bearer Request) from clause 5.5.1.2.2 (51-based handover, normal) in TS 23.401 [13] with the following clarification:

The PGW-C+SMF deletes the PDU Session if the QoS Flow associated with the default QoS rule in the PDU Session does not have an EPS Bearer ID assigned. If the QoS Flow associated with the default QoS rule has an EPS Bearer ID assigned, the PGW-C+SMF keeps the PDU Session (PDN connection) and for the remaining QoS Flows that do not have EPS bearer ID(s) assigned, the PGW-C+SMF maintains the PCC (Policy and Charging Control) rule(s) associated with those QoS Flows.

NOTE 5: The PGW-C+SMF initiating dedicated bearer activation for those maintained PCC rule(s) is described in step 18.

NOTE 6: If the QoS flow is deleted and the default QoS rule contains a Packet Filter Set that allows all UL packets or contains no Packet Filter Set, the IP flows of the deleted QoS rules are mapped to the default EPS bearer. If the default QoS rule contains packet filter(s), the IP flows in the deleted QoS Flow may be interrupted until step 18 of clause 5.5.1.2.2 in TS 23.401 [13].

15. The PGW-C+SMF initiates a N4 Session Modification procedure towards the UPF+PGW-U to update the User Plane path. The PGW-C+SMF releases the resource of the CN tunnel for PDU Session in UPF+PGW-U.

16. Step 16a (Modify Bearer Response) from clause 5.5.1.2.2 (51-based handover, normal) in TS 23.401 [13]. At this stage the User Plane path is established for the default bearer and the dedicated GBR bearers between the UE, target eNodeB, Serving GW and the PGW-U+UPF. The PGW-C+SMF uses the EPS QoS parameters as assigned for the dedicated EPS GBR bearers during the QoS flow establishment. PGW-C+SMF maps all the other IP flows to the default EPS bearer.

17. Step 17 from clause 5.5.1.2.2 (51-based handover, normal) in TS 23.401 [13].

18. The UE initiates a Tracking Area Update procedure as specified in TS 23.401 [13], clause 5.3.3.1 with modifications specified in clause 4.11.1.5.3.

When the old AMF decides not to maintain a UE registration for non-3GPP access anymore, the old AMF then unsubscribes from Subscription Data updates by sending an Nudm_SDM_Unsubscribe service operation to UDM and releases of all the AMF and AN resources related to the UE.

NOTE 7: The behaviour whereby the HSS (Home Subscriber Server)+UDM (Unified Data Management) cancels location of CN node of the another type, i.e. AMF is similar to HSS behaviour for MME and Gn/Gp SGSN registration (see TS 23.401 [13]). The target AMF of the cancel location by the HSS+UDM is one associated with 3GPP access.

19. The PGW-C+SMF initiates dedicated bearer activation procedure for non-GBR QoS Flows by mapping the parameters of the non-GBR Flows to EPC QoS parameters. This setup may be triggered by the PCRF+PCF, if PCC is deployed. This procedure is specified in TS 23.401 [13], clause 5.4.1. For Ethernet PDU Session Type, using non-IP PDN Type in EPS, this step is not applicable.

20. Step 21 from clause 5.5.1.2.2 (51-based handover, normal) in TS 23.401 [13].

21. If indirect forwarding was used, then the expiry of the timer at AMF started at step 12c triggers the AMF to invoke Nsmf_PDUSession_UpdateSMContext Request service operation with an indication to release the forwarding tunnels of the V-SMF, in order to release temporary resources used for indirect forwarding that were allocated at step 10. The V-SMF returns Nsmf_PDUSession_UpdateSMContext Response message.

Figure 6:
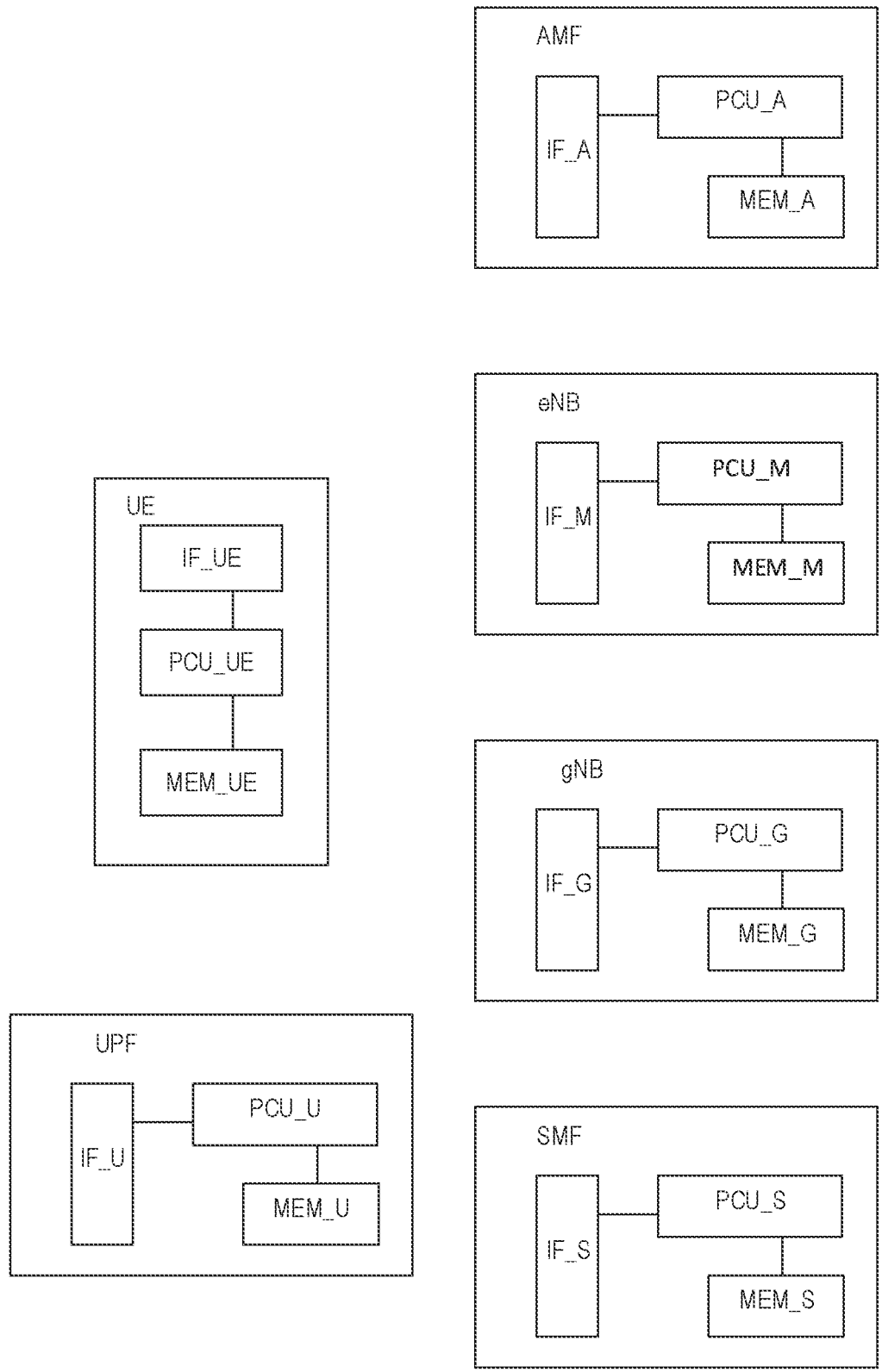
FIG. 6 shows an embodiment of the invention.

In FIG. 6, there is shown a user equipment, UE, apparatus according to an embodiment of the invention.

The UE comprises a processor PCU_UE an interface IF_UE and a memory, MEM_UE, in which memory instructions are stored for carrying out the method steps explained above. The UE communicates via the interface IF_UE. The IF_UE comprises both an external interface, communicating with a transmitter and receiver, and internal interfaces (not shown).

There is also shown an AMF comprising a processor PCU_A, an interface IF_A; and a memory, MEM_A. Instructions are stored in the memory for being performed by the processor such that the method steps explained above are carried out and signalling is communicated on the interface.

Further, an eNodeB (eNB) is provided comprising a processor PCU_M, an interface IF_M; and a memory, MEM_M. Instructions are stored in the memory for being performed by the processor such that the method steps explained above are carried out and signalling is communicated on the interface.

In FIG. 6, there is moreover shown a NG RAN/gNB comprising a processor PCU_G, an interface IF_G; and a memory, MEM_G. Instructions are stored in the memory for being performed by the processor such that the method steps explained above are carried out and signalling is communicated on the interface.

A SMF is provided comprising a processor PCU_S an interface IF_S; and a memory, MEM_S. Instructions are stored in the memory for being performed by the processor such that the method steps explained above are carried out and such that corresponding signalling is effectuated on the interface.

Finally, a UPF is provided comprising a processor PCU_U an interface IF_U; and a memory, MEM_U. Instructions are stored in the memory for being performed by the processor such that the method steps explained above are carried out and such that corresponding signalling is effectuated on the interface.

The above apparatuses/entities are adapted to communicate over known external telecom interfaces or via application programming interfaces, API, as appropriate.

It is noted that the features of the methods described above and in the following, may be implemented in software and carried out on a data processing device or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof. For example, the program code means may be loaded in a memory, such as a RAM (Random Access Memory), from a storage medium, such as a read-only memory (ROM) or other non-volatile memory, such as flash memory, or from another device via a suitable data interface, the described features may be implemented by hardwired circuitry instead of software or in combination with software.

A computer program or computer program product is provided carrying out the method steps defined above.

Figure 7:
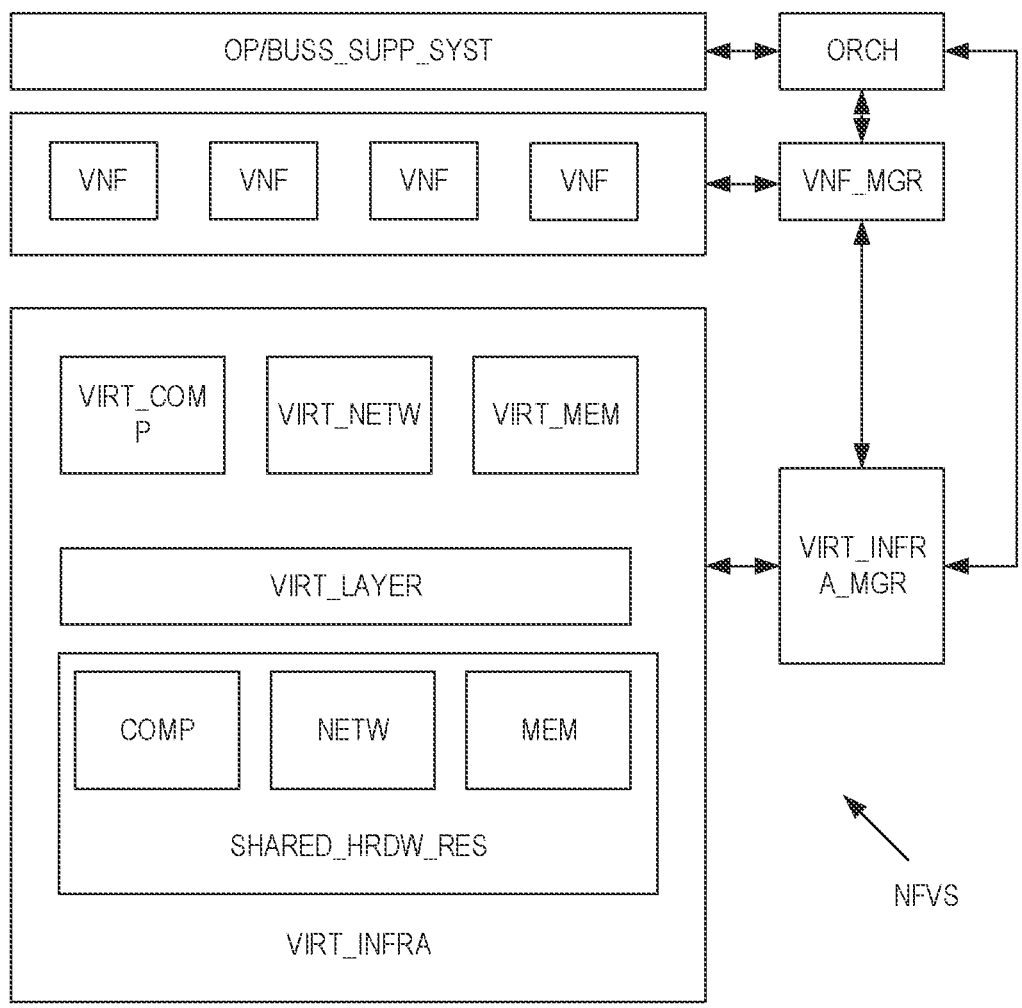
FIG. 7 shows additional flow diagrams of embodiments of the invention, corresponding to Fig. 4, ETSI GS NFV 002 V. 1.1.1 (2013 October)

The methods discussed above may alternatively be implemented by means of a system based on network functions virtualization. In FIG. 7, further embodiments of the invention are implemented by means of such a network function virtualization system, NFVS, formed on e.g. general-purpose servers, standard storage and switches. The NFVS may be arranged along the lines described in Fig. 4, ETSI GS NFV 002 V. 1.1.1 (2013 October) and comprises the following elements: A NFV management and orchestration system comprising an Orchestrator, ORCH, a VNF manager, VNF_MGR, and a virtualised Infrastructure manager, VIRT_INFRA_MGR. The NFVS moreover comprises an operational/business support system, OP/BUSS_SUPP_SYST; a number of virtual network function instances, VNF, by which the method steps explained above are instantiated; and a virtualised infrastructure, VIRT_INFRA. The VIRT_INFRA comprises a virtual computing, VIRT_COMP, virtual network; VIRT_NETW, and virtual memory, VIRT_MEM, a virtualisation layer, VIRT_LAYER, (e.g. hypervisor) and shared hardware resources, SHARED_HARDW_RES comprising computing devices, COMP, network devices, NETW, comprising e.g. standard switches and other network devices, and standard data storage devices, MEM.

Figure 8:
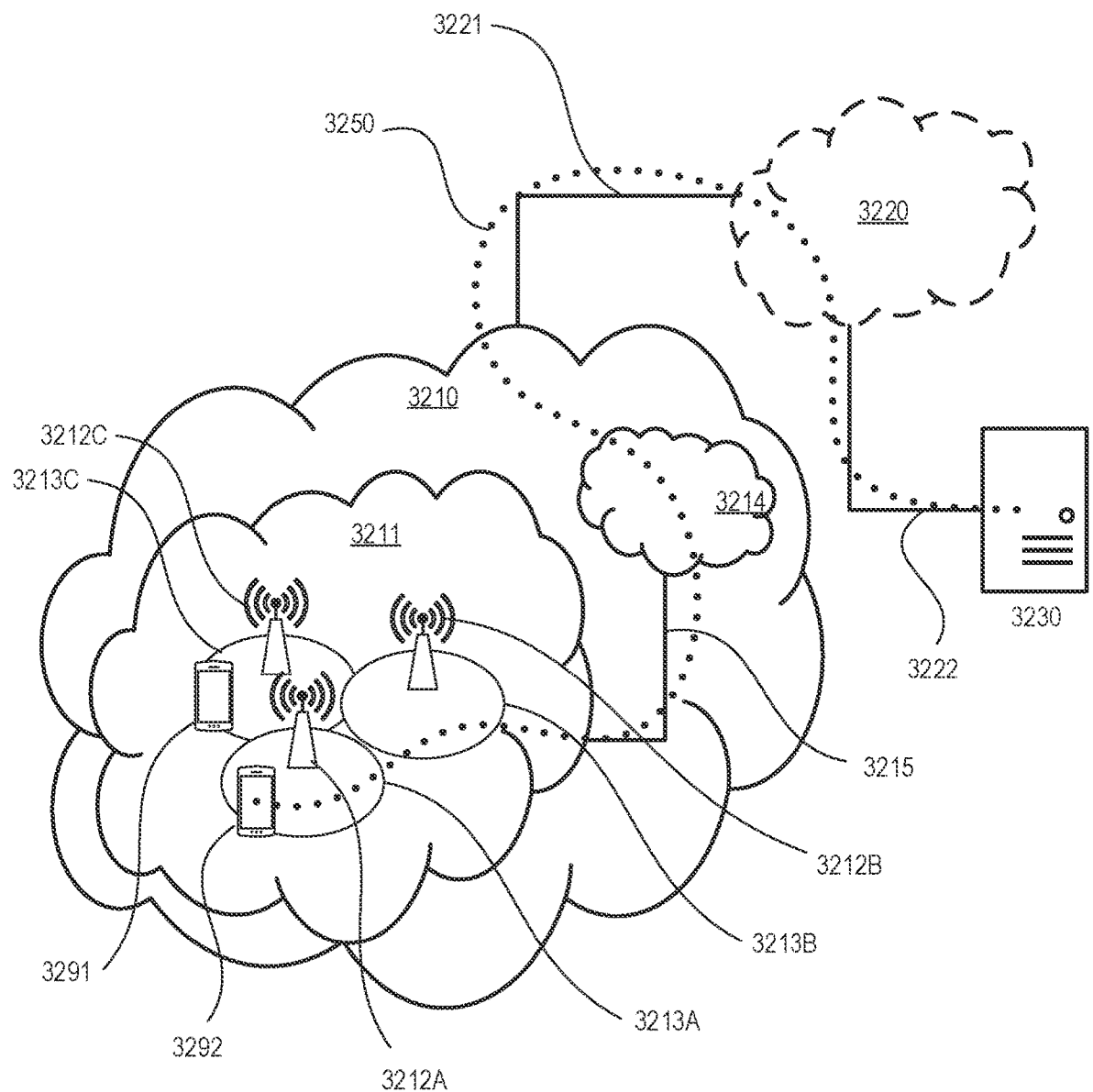
FIGS. 8 and 9 show further embodiments of the invention.
Figure 9:
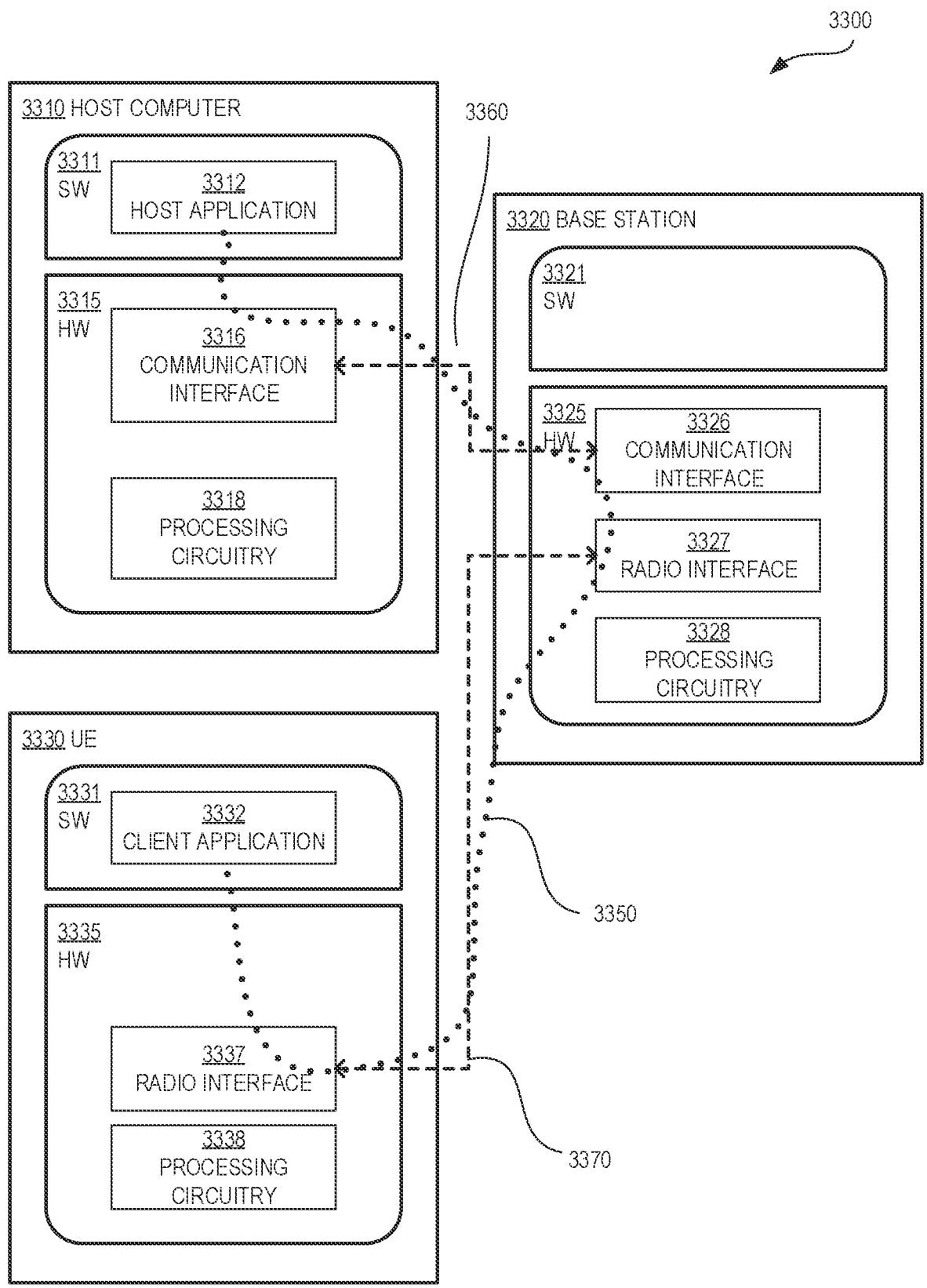

According to embodiments of the invention the methods above are may be implemented in the FIG. 8 or FIG. 9 realisations:

Also, one or more programs for a computer or computer program products, comprising instructions for carrying out any of methods according to the method steps above, are provided.

According to embodiments of the invention systems and apparatuses are disclosed, that may be realized by means of the FIG. 8+9 examples. Alternatively, systems and apparatuses may be instantiated in a cloud computing environment as a virtual node, c.f. FIG. 7, the cloud environment comprising shared hardware resources comprising at least computing devices (COMP), memory devices (MEM) and network devices (NETW).

With reference to FIG. 8, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider or may be operated by or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more subnetworks (not shown).

The communication system of FIG. 8 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signalling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 9. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 18) served by the base station 3320. The communication interface 3326 may be configured to facilitate a connection 3360 to the host computer 3310. The connection 3360 may be direct or it may pass through a core network (not shown in FIG. 18) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. It's hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

It is noted that the host computer 3310, base station 3320 and UE 3330 illustrated in FIG. 18 may be identical to the host computer 3230, one of the base stations 3212a, 3212b, 3212c and one of the UEs 3291, 3292 of FIG. 17, respectively. This is to say, the inner workings of these entities may be as shown in FIG. 18 and independently, the surrounding network topology may be that of FIG. 17.

In FIG. 9, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., since load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the services for such dual connectivity UE's.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signalling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 10 is a flowchart illustrating a method implemented in a communication system, in accordance with one embodiment. The communication system includes a host computer, a base station and a UE. For simplicity of the present disclosure, only drawing references to FIG. 19 will be included in this section. In a first step 3410 of the method, the host computer provides user data. In an optional sub step 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 11 is a flowchart illustrating a method implemented in a communication system, in accordance with one embodiment. The communication system includes a host computer, a base station and a UE. For simplicity of the present disclosure, only drawing references to FIG. 20 will be included in this section. In a first step 3510 of the method, the host computer provides user data. In an optional sub-step (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

In other words, there is provided:
A Method for a Long-Term Evolution Radio Access Node, LTE RAN, E-UTRAN, (eNB) adapted for
    engaging in a handover from a Next Generation RAN, denoted source RAN to said LTE RAN, denoted target RAN,
    receiving a Handover Request message, 6, from a Mobility Management Entity, MME,
    allocating, 6, resources or bearers requested by a Mobility Management Entity, MME, even though said resources or said bearers are not included in a transparent container from the source RAN.

There is also provided a method for a system and a system comprising
- a Long-Term Evolution Radio Access Node, LTE RAN, E-UTRAN, eNB,
- a Next Generation Radio Access Node, RAN, denoted target RAN
- an Access and Mobility Management Function, AMF,
- a Mobility Management Entity, MME, 103,
- a Serving Gateway, SGW,
- a Visited User Plane Function, V-UPF, the system being adapted for
- the NG RAN NG, denoted source RAN, deciding, 1, that the UE should be handed over to the LTE RAN, denoted target RAN, and sending a Handover Required to the AMF,
- the AMF determining, 2a, from a 'Target eNB Identifier' IE that the type of handover is Handover to E-UTRAN, the AMF selecting an MME, and sending Nsmf_PDU Session_Context Request requests the V-SMF for each PDU Session associated with 3GPP access to provide SM Context that also includes mapped EPS Bearer Contexts,
- the AMF receiving, 2c, a Nsmf_PDU Session_Context Request response,
- the AMF issuing a relocation request to the MME,
- the MME and SGW engaging, 4, 5, in create session request and response messaging,
- the MME issuing, 6, a handover request to the LTE RAN,
- the LTE RAN allocating, 6, resources or bearers requested by MME even though said resources or said bearers are not included in a transparent container from the source RAN.

The LTE RAN, 6, may moreover
- not be allocating a forwarding tunnel for the bearers not part of the source to target transparent container,
- including in target to source transparent container the bearers requested by source RAN and requested by core network.

The Access and Mobility Management Function, AMF, may be adapted to perform issuing a Nmsf Packet Data Unit, PDU, Session Context request to a SMF, 2a, even for PDU sessions without user plane currently, that is, also for PDU sessions not included in a Handover Required message, 1, from Next Generation, NG-Radio Access Node, RAN.

Also a method for an Access and Mobility Management Function, AMF, is provided, adapted to perform issuing a Nmsf Packet Data Unit, PDU, Session Context request to a SMF, 2a, even for PDU sessions without user plane currently, that is, also for PDU sessions not included in a Handover Required message, 1, from Next Generation, NG, —Radio Access Node, RAN.

A method for an AMF is provided adapted for not applying indirect data forwarding for the PDU sessions that does not have user plane in Next Generation, NG-Radio Access Node, RAN previously.

A method for a next Generation—Radio Access Node, NG RAN, gNB, is provided adapted to accept a handover command, 11a, from an Access and Mobility Management Function, AMF even when a transparent container from a target RAN, such as eNB, includes more user plane for bearers than NG-RAN required, 1, the NG-RAN moreover adapted for delivering the handover command, 11b, to UE.

Also, a method for a UE being adapted for correlating, 11, QoS flows that does not have user plane resource currently with EPS bearer IDs to be setup in the HO command.

Further, according to embodiments there is provided:

A Long-Term Evolution Radio Access Node, LTE RAN, E-UTRAN, eNB, having a radio interface, IF_M, and processing circuitry, PCU_M, the base station's processing circuitry adapted for
- engaging in a handover from a Next Generation RAN, denoted source RAN to said LTE RAN, denoted target RAN,
- receiving a Handover Request message, 6, from a Mobility Management Entity, MME,
  - allocating, 6, resources or bearers requested by a Mobility Management Entity, MME, even though said resources or said bearers are not included in a transparent container from the source RAN.

Access and Mobility Management Function, AMF, adapted to perform issuing a Nmsf Packet Data Unit, PDU, Session Context request to a SMF, 2a, even for PDU sessions without user plane currently, that is, also for PDU sessions not included in a Handover Required message, 1, from Next Generation, NG-Radio Access Node, RAN.

A next Generation Radio Access Node, RAN, NG-RAN, gNB, adapted to accept a handover command, 11a, from an AMF even when a transparent container from a target RAN, such as an LTE RAN, eNB, includes more user plane for bearers than NG-RAN required, 1, the NG-RAN moreover adapted for delivering the handover command, 11b, to UE.

A UE being adapted for correlating, 11, QoS flows that does not have user plane resource currently with EPS bearer IDs to be setup in the HO command.

The invention claimed is:

1. A method for handover of one or more Protocol Data Unit, PDU, sessions of a User Equipment, UE, from a $5^{th}$ Generation, 5G, System, 5GS, to an Evolved Packet System, EPS, wherein the one or more PDU sessions comprise at least one PDU session without a User Plane, UP, connection, the method comprising:
  at a Next Generation Radio Access Network, NG-RAN, node of the 5GS:
    sending, to an Access and Mobility Function, AMF, of the 5GS, a handover required message for handover of the UE to an Evolved Universal Terrestrial Radio Access Network, E-UTRAN, of the EPS, the handover required message comprising a source to target transparent container that comprises information that indicates one or more bearers corresponding to 5G Quality of Service, QoS, flows for data forwarding;
  at the AMF:
    receiving the handover required message from the NG-RAN node; and
    sending a forward relocation request to a Mobility Management Entity, MME, of the EPS, the forward relocation request comprising Packet Data Network, PDN, connection information for one or more Session Management Functions, SMFs, holding the at least one PDU session without a UP connection;
  at the MME:
    receiving the forward relocation request from the AMF; and
    sending, to an E-UTRAN node of the EPS, a handover request, the handover request comprising information that indicates one or more bearers requested by the MME for the handover; and
  at the E-UTRAN node:
    receiving the handover request from the MME; and
    for each bearer of the one or more bearers requested by the MME in the handover request, allocating resources for the bearer even if the bearer is not one of the one or more bearers indicated in the source to target transparent container.

2. A method performed by an Evolved Universal Terrestrial Radio Access Network, E-UTRAN, node in an Evolved Packet System, EPS, for handover of one or more Protocol Data Unit, PDU, sessions of a User Equipment, UE, from a 5th Generation, 5G, System, 5GS, to the EPS, wherein the one or more PDU sessions comprise at least one PDU session without a User Plane, UP, connection, the method comprising:

receiving a handover request from a Mobility Management Entity, MME, of the EPS for handover of the one or more PDU sessions of the UE from the 5GS to the EPS, the handover request comprising information that indicates one or more bearers requested by the MME for the handover; and for each bearer of the one or more bearers requested by the MME in the handover request, allocating resources for the bearer even if the bearer is not one of the one or more bearers indicated in a source to target transparent container.

\* \* \* \* \*